US009311391B2

(12) United States Patent
Lepsoy et al.

(10) Patent No.: US 9,311,391 B2
(45) Date of Patent: Apr. 12, 2016

(54) METHOD AND SYSTEM OF CONTENT RECOMMENDATION

(75) Inventors: Skjalg Lepsoy, Torino (IT); Gianluca Francini, Torino (IT); Fabrizio Antonelli, Torino (IT)

(73) Assignee: Telecom Italia S.p.A., Milan (IT)

(*) Notice: Subject to any disclaimer, the term of this patent is extended or adjusted under 35 U.S.C. 154(b) by 294 days.

(21) Appl. No.: 13/142,587

(22) PCT Filed: Dec. 30, 2008

(86) PCT No.: PCT/EP2008/068355
§ 371 (c)(1),
(2), (4) Date: Jun. 28, 2011

(87) PCT Pub. No.: WO2010/075888
PCT Pub. Date: Jul. 8, 2010

(65) Prior Publication Data
US 2011/0258196 A1    Oct. 20, 2011

(51) Int. Cl.
*G06F 17/30* (2006.01)
*G06Q 30/02* (2012.01)

(52) U.S. Cl.
CPC ............ *G06F 17/3069* (2013.01); *G06Q 30/02* (2013.01); *G06F 17/30616* (2013.01)

(58) Field of Classification Search
CPC ................. G06F 17/30616; G06F 17/3069
See application file for complete search history.

(56) References Cited

U.S. PATENT DOCUMENTS

| 4,839,853 | A | * | 6/1989 | Deerwester et al. | |
|---|---|---|---|---|---|
| 5,301,109 | A | * | 4/1994 | Landauer et al. | 704/9 |
| 5,675,819 | A | * | 10/1997 | Schuetze | 704/10 |
| 5,873,056 | A | * | 2/1999 | Liddy et al. | 704/9 |
| 5,895,464 | A | * | 4/1999 | Bhandari et al. | 704/9 |
| 5,950,189 | A | * | 9/1999 | Cohen et al. | |
| 5,953,718 | A | * | 9/1999 | Wical | |
| 5,983,237 | A | * | 11/1999 | Jain et al. | |
| 6,138,116 | A | * | 10/2000 | Kitagawa et al. | 707/752 |

(Continued)

FOREIGN PATENT DOCUMENTS

EP    1 199 647 A2    4/2002

OTHER PUBLICATIONS

Simon et al., "On Updating Problems in Latent Semantic Indexing," SIAM Journal of Scientific Computing, vol. 21, pp. 782-791, (1999).

(Continued)

*Primary Examiner* — Christyann Pulliam
*Assistant Examiner* — Mellissa M Ohba
(74) *Attorney, Agent, or Firm* — Finnegan, Henderson, Farabow, Garrett & Dunner, L.L.P.

(57) ABSTRACT

A method of content recommendation, includes: generating a first digital mathematical representation of contents to associate the contents with a first plurality of words describing the contents; generating a second digital mathematical representation of text documents different from the contents to associate the documents with a second plurality of words; processing the first and second pluralities of words to determine a common plurality of words; processing the first and second digital mathematical representations to generate a common digital mathematical representation of the contents and the text documents based on the common plurality of words; and providing content recommendation by processing the common digital mathematical representation.

8 Claims, 8 Drawing Sheets

(56) References Cited

U.S. PATENT DOCUMENTS

| | | | |
|---|---|---|---|
| 6,356,864 B1* | 3/2002 | Foltz et al. | 704/1 |
| 6,446,061 B1* | 9/2002 | Doerre et al. | 707/738 |
| 6,560,597 B1* | 5/2003 | Dhillon et al. | |
| 6,611,825 B1* | 8/2003 | Billheimer et al. | 706/45 |
| 6,615,208 B1* | 9/2003 | Behrens et al. | 707/754 |
| 6,701,305 B1 | 3/2004 | Holt et al. | |
| 6,847,966 B1* | 1/2005 | Sommer et al. | 707/739 |
| 6,965,898 B2* | 11/2005 | Aono et al. | |
| 7,269,598 B2* | 9/2007 | Marchisio | |
| 7,844,595 B2* | 11/2010 | Canright et al. | 707/709 |
| 2003/0159106 A1* | 8/2003 | Aono et al. | 715/500 |
| 2004/0165684 A1* | 8/2004 | Ketchum et al. | 375/343 |
| 2005/0021517 A1* | 1/2005 | Marchisio | 707/4 |
| 2005/0165782 A1* | 7/2005 | Yamamoto | 707/7 |
| 2005/0234686 A1* | 10/2005 | Cheng et al. | 703/2 |
| 2006/0235870 A1* | 10/2006 | Musgrove | 707/102 |
| 2006/0259481 A1 | 11/2006 | Handley | |
| 2008/0104063 A1* | 5/2008 | Gallivan et al. | 707/5 |
| 2009/0125498 A1* | 5/2009 | Cao et al. | 707/5 |
| 2009/0299975 A1* | 12/2009 | Coifman et al. | 707/3 |
| 2010/0070507 A1* | 3/2010 | Mori | 707/741 |
| 2010/0131515 A1* | 5/2010 | Canright et al. | 707/742 |

OTHER PUBLICATIONS

Zelikovitz et al., "Using LSI for Text Classification in the Presence of Background Text," Proceedings of CIKM-01, 1o-th ACM International conference on Information and Knowledge Management, pp. 113-118, retrevied from URL: http://citeseerx.ist.psu.edu/viewdoc/summary?doi=10.1.1.1.7005> (2001).

Berry et al., "Using Linear Algebra for Intelligent Information Retrieval," Society for Industrial and Applied Mathematics, vol. 37, No. 4, pp. 573-595, (1995).

Brand, Fast Low-Rank Mofifications of the Thin Singular Value Decomposition, Linear Algebra and its Applications, vol. 415, No. 1, pp. 20-30, (2006).

Park et al., "Hybrid Pre-Query Term Expansion Using Latent Semantic Analysis," Proceedings of the Fourth IEEE International Conference on Data Mining, PP. 1-8, (2004).

Roussinov et al., "Mining Context Specific Similarity Relationships Using the World Wide Web," Proceedings of Human Language Technology Conference on Empirical Methods iin Natural Language Processing, pp. 599-506, (2005).

Sarwar et al., "Application of Dimensionality Reduction in Reduction in Recommender Systems—A Case Study," ACM webKDD workshop, pp. 1-12, (2000).

Rosenstein et al., "Recommending From Content: Preliminary Results From an E-Commerce Experiment," Conference on Human Factors in Computing Systems (CHI'00), pp. 1-2, (1999).

Rocha et al., "Biologically Motivated Distributed Designs for Adaptive Knowledge Management," Design Principles for Immune Systems and other Distributed Autonomous Systems, Segal and Cohen (Eds.), Santa Fe Institute Series in the Sciences of Complexity, Oxford University Press, pp. 305-334, (2001).

International Search Report from the European Patent Office for International Application No. PCT/EP2008/068355 (maile date Sep. 29, 2009).

* cited by examiner

METHOD AND SYSTEM OF CONTENT RECOMMENDATION

CROSS REFERENCE TO RELATED APPLICATION

This application is a national phase application based on PCT/EP2008/068355, filed Dec. 30, 2008.

BACKGROUND

1. Technical Field

The present invention relates to the field of content recommendations, i.e. the methods that attempt to present contents, such as films, music files, videos, books, news, images, web pages, that are likely of interest to the user.

2. Description of the Related Art

Many recommendation techniques are known: some of them provide recommendations based on the user's predilections expressed by means of explicit votes, while other techniques are based on the observation of the contents that a user chooses. The online DVD rental service Netflix (www.netflix.com) is of the first type and operates by recommending users a list of films which have not yet been rented. The list of films is estimated by comparing previous user's votes with the ones of other users.

The Internet Movie Database (IMDb) is an online database of information related to films, actors, television shows, production crew personnel, video games, and most recently, fictional characters featured in visual entertainment media. This database employs another recommendation technique which is based on the contents and does not exploit the user's predilections.

Recommendation techniques based on the content generally employ texts describing in written form the contents and use information retrieval methods to determine relations between contents. Document "Hybrid pre-query term expansion using Latent Semantic Analysis", Laurence A. F. Park, Kotagiri Ramamohanarao, Proceedings of the Fourth IEEE International Conference on Data Mining (ICDM'04) describes an information retrieval method in which a query map using single Value Decomposition and Latent Semantic Analysis is built.

Document "Recommending from Content: Preliminary Results from an E-Commerce Experiment", Mark Rosenstein, Carol Lochbaum, Conference on Human Factors in Computing Systems (CHI '00) discloses the effects of various forms of recommendations on consumer behaviour at a web site using also Latent Semantic Indexing. H. Zha and H. Simon in "On updating problems in latent semantic indexing", SIAM Journal of Scientific Computing, vol. 21, pp. 782-791, 1999" and M. Brand in "Fast low-rank modifications of the thin singular value decomposition", Linear Algebra and its Applications, vol. 415, pp. 20-30, 2006" have disclosed an incremental LSA technique according to which additive modifications of a singular value decomposition (SVD) to reflect updates, downdates and edits of the data matrix is developed.

Rocha Luis M., Johan Bollen in "Biologically Motivated Distributed Designs for Adaptive Knowledge Management, Design Principles for the Immune System and other Distributed Autonomous Systems", L. Segel and I. Cohen (Eds.) Santa Fe Institute Series in the Sciences of Complexity; Oxford University Press, pp. 305-334. 2001 discuss the adaptive recommendation systems TalkMine and @ApWeb that allow users to obtain an active, evolving interaction with information resources.

Badrul M. Sarwar, George Karypis, Joseph A. Konstan, John T. Riedl in "Application of Dimensionality Reduction in Recommender System"—A Case Study", ACM WebKDD Workshop, 2000, disclose a technique based on the Singular Value Decomposition permitting to improve the scalability of recommender systems. Document US2006/0259481 refers to a method of analysing documents in the field of the information retrieval which uses a Latent Semantic Analysis to infer semantic relations between terms and to achieve dimensionality reduction of processed matrices.

BRIEF SUMMARY OF THE INVENTION

The Applicant has noticed that the known recommendation techniques based on the textual content description show unsatisfying accuracy. With particularly reference to video contents, the Applicant has observed that the known systems can produce video recommendations that are not properly linked by the same or analogous thematic. This inaccuracy increases when the texts describing the contents are very short and include insufficient information.

The Applicant has noticed that an improved accuracy can be obtained by considering in the recommendation processing not only the set of texts describing the contents but also a number of external texts, such as for instance newspaper articles, discussing general arguments not exclusively connected to the contents object of the recommendations. According to a first object, the present invention relates to a method of content recommendation as defined in the appended claim 1. Particular embodiments of such method are described by the dependent claims 2-11. The invention also relates to a software comprising codes for carrying out the method of claim 1. According to a further object, the invention relates to a content recommendation system as defined by the appended claim 12 and to embodiments of the system as described by the dependent claims 13-15.

BRIEF DESCRIPTION OF THE SEVERAL VIEWS OF THE DRAWINGS

Further characteristics and advantages will be more apparent from the following description of a preferred embodiment and of its alternatives given as a way of an example with reference to the enclosed drawings in which.

DETAILED DESCRIPTION

Content Recommendation System

Figure 1:
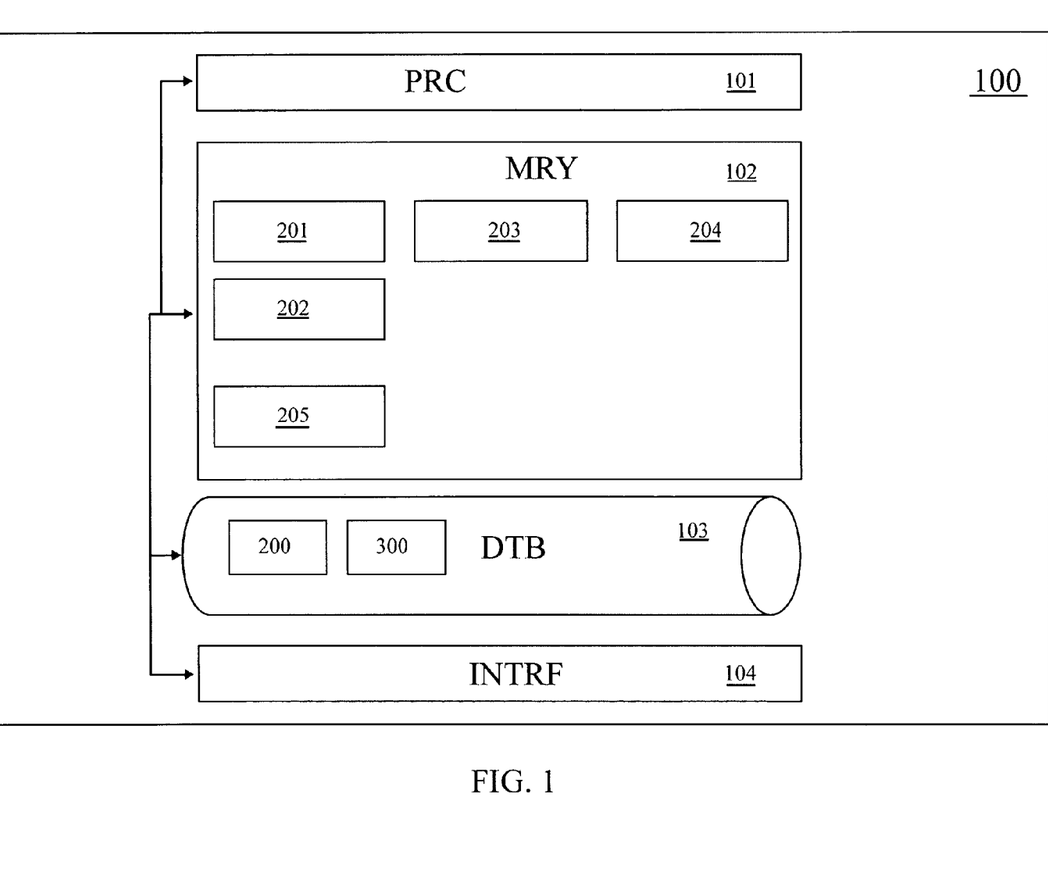
FIG. 1 shows an embodiment of a content recommendation system.

FIG. 1 shows a content recommendation system 100 in accordance with an embodiment of the invention. Particularly, content recommendation system 100 is employable to provide recommendations to users in connection with any type of contents such as, for instance films, videos, reportages, audio contents or books, which can be associated with corresponding content text documents 200 providing a description of the contents such as, content summaries. These content text documents 200 include a first plurality of words. Moreover, a plurality of context documents 300 which are different from the contents documents 200 and their describing texts is defined. Such context document can be, as an example, newspaper articles describing a subject also taking into account the point of view of people located in a specific area. The newspaper articles are preferred since they are a proper representation of arguments and subjects known by people of a particular area and of their culture. The plurality of context documents 300 includes a second plurality of words. Moreover it is observed that these context documents 300 do not represent votes, opinions or feedback information provided by the users in using the system 100.

The content recommendation system 100 comprises a processor 101 (PRC), a memory 102 (MRY), a database 103 (DTB) and a user interface 104 (INTRF). Particularly, software modules configured to perform processing and apply algorithms in accordance with the described example of the invention are stored in the memory 102. In accordance with said example, the following modules are stored in the memory 102: a first generation module 201, a second generation module 202, a first processing module 203, a second processing module 204 and a recommendation module 205. The database 103 may store data corresponding to the content text documents 200 and the context documents 300. The first generation module 201 is configured to generate a first mathematical representation of the content text documents 200. The second generation module 202 is configured to generate a second mathematical representation of the context documents 300.

The first processing module 203 is configured to process the first and second pluralities of words to determine a common plurality of words including significant words of both first and second pluralities. The second processing module 204 is structured to process the first and second mathematical representations to generate a third mathematical representation defining the content text documents 200 and the context documents 300 which is based on the common plurality of words. The recommendation module 205 is configured to provide content recommendation by processing the third mathematical representation.

The mathematical representations above indicated can be expressed and stored in a digital form in order to allow processing by the processor 101. It has to be observed that according to a particular embodiment the mathematical representations above indicated are matrix representations in which any document is represented by a vector containing weights associated to specific words of the represented document text. However, any other mathematical representation is possible which allows defining and determining a similarity between documents.

Method of Content Recommendation

Figure 2:
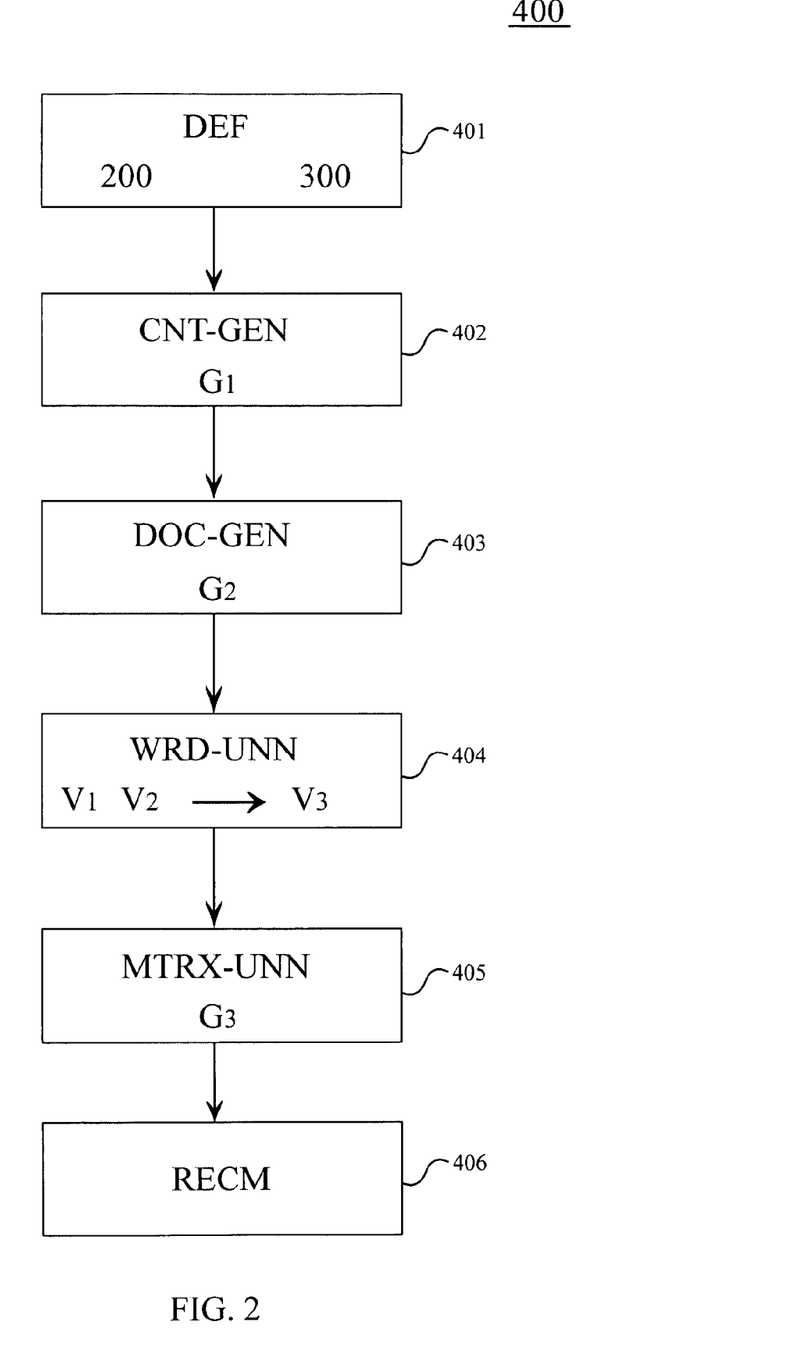
FIG. 2 illustrates a flow chart for an embodiment of a method of content recommendation.

FIG. 2 shows by means of a flow chart a method of content recommendation 400, which is implementable by the recommendation system 100. The method of content recommendation 400 is, preferably, of the type "based on the content" and therefore it does not require any information, vote, opinion or feedback provided from users during the running of the recommendation method 400. The method of content recommendation 400 comprises a definition step 401 (DEF) in which the content text documents 200 (e.g. summaries of videos or films) and the plurality of context documents 300 corresponding, preferably, to newspaper articles are defined. In a first generation step 402 (CNT-GEN) the first plurality of words associated with the content text documents 200 are processed and a first document-word matrix $G_1$ is generated to represent the content text documents 200. This first processing step 402 can be implemented by the first generation module 201 of FIG. 1. In a second generation step 403 (DOC-GEN) the second plurality of words associated with the context documents 300 are processed and a second document-word matrix $G_2$ is generated to represent the context documents 300. The second generation step 403 can be implemented by the second generation module 202 of the content recommendation system 100.

The recommendation method 400 includes a first processing step 404 (WRD-UNN) in which the first plurality of words of the content text documents 200 and the second plurality of words of the context documents 300 are processed to create a common plurality of words, such as single vocabulary. This first processing step 404 can be carry out by the first processing module 203. Moreover, the recommendation method 400 includes a second processing step 405 (MTRX-UNN) wherein the first and second document-word matrices $G_1$ and $G_2$ are processed to generate a third document-word matrix $G_3$ defining a specific merging of the content text documents 200 and the text documents 300 which is based on the common plurality of words defined in the second generation step 404. The second processing step 405 can be carried out by the second processing module 204.

Particularly, as it will be explained in greater detail later, the generation of the first document-word matrix $G_1$, the second word-document matrix $G_2$ and the third document-word matrix $G_3$ is performed computing weights to be associated with each word of the common plurality by evaluating Term Frequency factors and Inverse Document Frequency Factors.

In a recommendation step 406 (RECM) the third document-word matrix $G_3$ is processed so as to provide a content recommendation which allows linking a content to another one, as an example, by means of indexes that are stored in the database 103. In accordance with a particular example, the recommendation step 406 includes processing the third document-word matrix $G_3$ by using a Latent Semantic Analysis (LSA) which allows obtaining a document-word matrix structured in such a way that semantic relations between words are better identifiable. Moreover, the Latent Semantic Analysis permits dimensionality reduction which corresponds to a reduction of computing complexity. The link between contents is determined by applying to vectors included in the third document-word matrix $G_3$ as processed by the LSA a similarity function.

The Applicants has noticed that adding selected context documents to content text documents allows strengthening words relations and creating new words relations that permit to obtain recommendation results which are enriched and improved in comparison with the ones obtainable exclusively on the contents words.

Steps 402 and 403 of Generation of First and Second Document-Word Matrices

Figure 3:
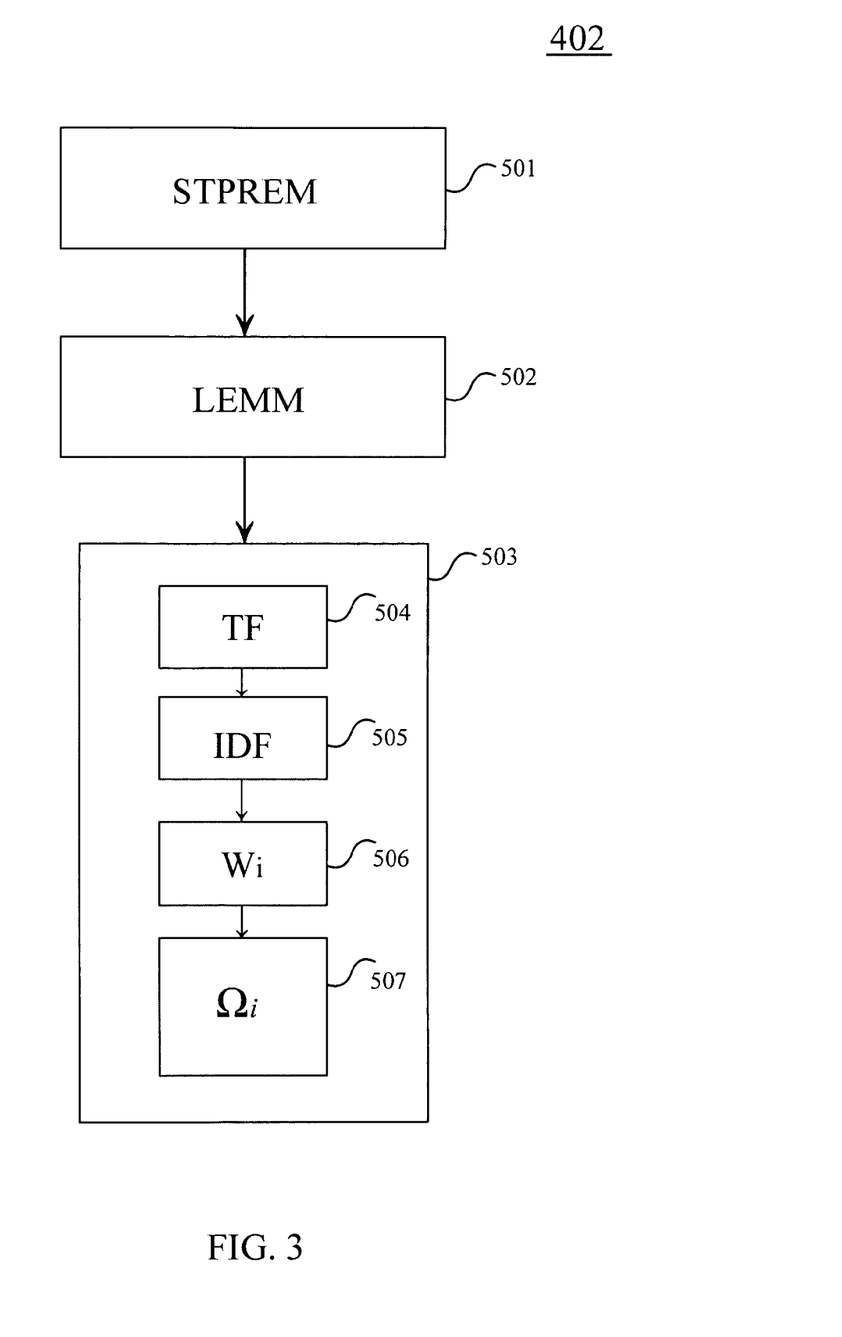
FIG. 3 shows by a flow chart an example of a method of generating first and second document-word matrices.

FIG. 3 shows by a flow chart an example of the first generation step 402 in which the first document-word matrix $G_1$ is computed. The method described with reference to FIG. 3 is also valid for the second generation step 403 in which the second document-word matrix $G_2$ is computed.

According to the particular first generation step 402 of FIG. 3, a vectorial representation of each content text document is employed. The first generation step 402 includes the following steps: a stopwords removing step 501 (STPREM), a lemmatisation step 502 (LEMM), a vectorial representation step 503 and a matrix generation step 508 (MTX). In greater detail, in the stopwords removing step 501 the words that in a language occurs so frequently that can be considered without information content are removed. As an example, the words to be removed are grammar articles, preposition, pronouns, but also common verbs such as "to do" or "to go", and so on. With reference to the Italian language, a standard list of the stopwords is available on the web page: http://members.unine.ch/jacques.savoy/clef/italianST.txt. The stopwords removing allows to maximise the useful information included in the vectorial representation to be evaluated. The words set comprised in the content text document i is $C_i$ and the set of stopwords for the particular language considered is S. The stopwords removing step 501 creates a new set of words $D_i$ associated with the i-th content text document:

$$D_i = C_i - S$$

Lemmatisation 502 is the process of grouping together the different inflected forms (e.g. good and better) of a word so they can be analysed as a single item. With reference to the Italian language, a lemmas vocabulary is available on the web page: http://sslmitdev-online.sslmit.unibo.it/linguistics/morph-it.php. The lemmatisation step 502 is performed by a non invertible function $f_L$: $f_L(p)=l$, wherein l is the word to lemmatise and p is a reference lemma.

The vectorial representation step 503 provides for the representation of each content text document 200 by means of a vector expressed in the keywords space. A keyword is one of the terms resulting from the stopwords removing step 501 and lemmatisation step 502. In accordance with the above definitions, a keyword k is:

$$k = f_L(p) : p \in D_i \text{ wherein } D_i = C_i - S \quad (1)$$

A vocabulary is a words set consisting of all or some of the keywords as defined by the expression (1). In a vocabulary there are no equal words. The content text documents 200 define a first vocabulary V1 and the context documents 400 define a second vocabulary V2. The vectorial representation is performed, as an example, by applying the term frequency-inverse document frequency (tf-idf) method.

In accordance with the tf-idf method a computing of the TF factor (step 504) and a computing of the IDF (step 505) factor are performed. With reference to the TF factor, $P_i$ is a keywords set included in a content text document; the TF factor for a keyword k is defined as:

$$TF_i(k) = \frac{n_k}{\sum_j n_j} \quad j \in P_i \quad (2)$$

In accordance with expression (2); TF factor is the internal normalised frequency, i.e. the ratio between the number of occurrences $n_k$ of the keyword k in a i-th document and the number of occurrences of all keywords in the i-th document. The TF factor indicates the actual importance of that keyword in the document.

The inverse document frequency IDF is a measure of the general importance of the word within a collection of documents and is obtained by dividing the number of all documents N by the number $d_k$ of documents containing the keyword k, and then taking the logarithm of that quotient:

$$IDF(k) = \log\left(\frac{N}{d_k}\right) \quad (3)$$

In a weight calculation step 506, a weight $w_i$ of keyword k in content text document i is computed as product of the TF and IDF factors:

$$w_i(k) = TF_i(k) \times IDF(k) \quad (4)$$

$$w_i(k) = \frac{n_k}{\sum_j n_j} \times \log\left(\frac{N}{d_k}\right)$$

Formula (4) is repeated for all keywords in connection with the content text document i. Each content text document i is described through a corresponding vector $\Omega_i$ having a length equal to the number of keywords in the vocabulary. Each components of vector $\Omega_i$ is a keyword weight. Defining V1 as the vocabulary associated with the content text documents, in a vector representation step 507, the keywords vector $\Omega_i$ associated with the content text document i is defined as:

$$\Omega_i = [w_i(k_1), w_i(k_2), \Lambda, w_i(k_m)] \ k_1, k_2, K, k_m \in V1 \quad (5)$$

In the matrix generation step 508 (MTX), all the vectors $\Omega_i$ associated with a corresponding content text document of set 200 are organised as rows of the first document-word matrix $G_1$. The first document-word matrix $G_1$ shows rows associated with a content text documents and columns associated with a respective word; each element of the matrix is a weight computed in accordance with the tf-idf method. In analogous way, the second document-word matrix $G_2$ can be determined in the second generation step 403.

As an example, a document for which a document-word matrix has to be determined is:

"Centuries ago there lived . . . . "A king!" my little readers will say immediately."

After stopwords removing (step 501), the sentence is:
"centuries ago lived king little readers say immediately"
the lemmatisation step 503 converts the sentence in:
"century ago live king little reader say immediately"
The vocabulary to be used in this example consists of sixteen words, numbered from 1 to 16: little (1), live (2), do (3), king (4), ago (5), carpenter (6), concrete (7), airplane (8), milk (9), spaceship (10), immediately (11), house (12), reader (13), century (14), master (15), say (16).

The above indicated document includes only some of the vocabulary words and specifically the ones having the following positions: 1, 2, 4, 5, 11, 13, 14, 16; each one of this word appears once. Table 1 shows the number of occurrences of all the vocabulary words in the above document:

TABLE 1

| 1 | little | 1 |
| 2 | live | 1 |
| 3 | do | 0 |
| 4 | king | 1 |
| 5 | ago | 1 |
| 6 | carpenter | 0 |
| 7 | concrete | 0 |
| 8 | airplane | 0 |
| 9 | milk | 0 |
| 10 | spaceship | 0 |
| 11 | immediately | 1 |
| 12 | house | 0 |
| 13 | reader | 1 |
| 14 | century | 1 |
| 15 | master | 0 |
| 16 | say | 1 |

The third column of Table 1 is a vector which describes the document in a non weighted manner:

| 1 | 1 | 0 | 1 | 1 | 0 | 0 | 0 | 0 | 0 | 1 | 0 | 1 | 1 | 0 | 1 |

Considering that the vector above indicated includes eight words having non-zero occurrences, the TF vector can be obtained by dividing each element by 8:

| 1/8 | 1/8 | 0 | 1/8 | 1/8 | 0 | 0 | 0 | 0 | 0 | 1/8 | 0 | 1/8 | 1/8 | 0 | 1/8 |
|---|---|---|---|---|---|---|---|---|---|---|---|---|---|---|---|

According to the example a set of ten documents is considered and the number of documents containing the defined words is:

| 1  | little      | 4 |
|----|-------------|---|
| 2  | live        | 1 |
| 3  | do          | 8 |
| 4  | king        | 3 |
| 5  | ago         | 6 |
| 6  | carpenter   | 1 |
| 7  | concrete    | 1 |
| 8  | airplane    | 2 |
| 9  | milk        | 1 |
| 10 | spaceship   | 5 |
| 11 | immediately | 8 |
| 12 | house       | 4 |
| 13 | reader      | 2 |
| 14 | century     | 1 |
| 15 | master      | 1 |
| 16 | say         | 1 |

It is clear from expression (3) that the vector containing the IDF factors for the considered document is:

|       |
|-------|
| 0.916 |
| 2.302 |
| 0.223 |
| 1.203 |
| 0.510 |
| 2.302 |
| 2.302 |
| 1.609 |
| 2.302 |
| 0.693 |
| 0.223 |
| 0.916 |
| 1.609 |
| 2.302 |
| 2.302 |
| 2.302 |

According to the expression (4), the tf-idf vector associated with the document above introduced is:

| 0.114 | 0.287 | 0 | 0.150 | 0.063 | 0 | 0 | 0 | 0 | 0 | 0.027 | 0 | 0.201 | 0.287 | 0 | 0.287 |
|---|---|---|---|---|---|---|---|---|---|---|---|---|---|---|---|

A number of ten vectors each associated with a respective document of the considered set represents the document-word matrix.

First Processing Step 404: Creation of the Common Plurality of Words

According to the described example, in the first processing step 404 a common vocabulary V3 is created starting from the first plurality of words, i.e. the first vocabulary V1 of the content text documents 200, and the second plurality of words, i.e. the second vocabulary V2 of the context documents 300. The first vocabulary V1 and the second vocabulary V2 are not equal. The common vocabulary V3 can be obtained by a union of the first and second vocabularies or intersection of the first and second vocabularies V1 and V2, or by choosing only the first vocabulary V1 or only the second vocabulary V2.

Preferably, the common vocabulary V3 is obtained by a union (in accordance with the set theory) of the first and second vocabularies V1 and V2 and therefore by taking into account all the keywords included in such vocabularies. As an example, the union technique allows to find that two words that are uncorrelated in the first vocabulary V1 result linked each other in the common vocabulary V3 due to the fact that they show a relation to the same word belonging to the second vocabulary V2.

A method for converting the first vocabulary V1 and the second vocabulary V2 into the common vocabulary V3 is described hereinafter. The numbers $N_1$ and $N_2$ are the number of words of the first and second vocabularies, respectively. The indexes identifying the words of the two vocabularies to be merged are $W_1$ and $W_2$:

$$W_1 = \{1, K, N_1\}$$

$$W_2 = \{1, K, N_2\}$$

The number of words included in the common vocabulary V3 is $N_b$:

$$W_b = \{1, K, N_b\}$$

The conversion of the first and second vocabularies V1 and V2 into the common vocabulary V3 is performed, as an example, by applying a first conversion function $f_1$ and a second conversion function $f_2$:

$$f_1 : W_1 \to W_b \cup \{0\}$$

$$f_2 : W_2 \to W_b \cup \{0\},$$

the two conversion functions $f_1$ and $f_2$ are so that the word having index i is converted in the same word having an index j belonging to the $W_b$ set or in 0 (null) if the word is not present in the common vocabulary (this situation can occur when the latter is not obtained by union of the two vocabularies). As an example, the first vocabulary includes the words: bread (index 1), butter (index 2), milk (index 3). The second vocabulary includes the words: water (index 1), wine (index 2), bread (index 3). The common vocabulary includes the following words: bread (index 1), butter (index 2), milk (index 3), water (index 4), wine (index 5). Therefore, the word "water" having index 1 in the second vocabulary assumes an index 4 in the common vocabulary, while the word "bread" keeps the same index from the first vocabulary.

First Embodiment of Second Processing Step 405: Generation of the Third Document-Word Matrix $G_3$.

Figure 4:
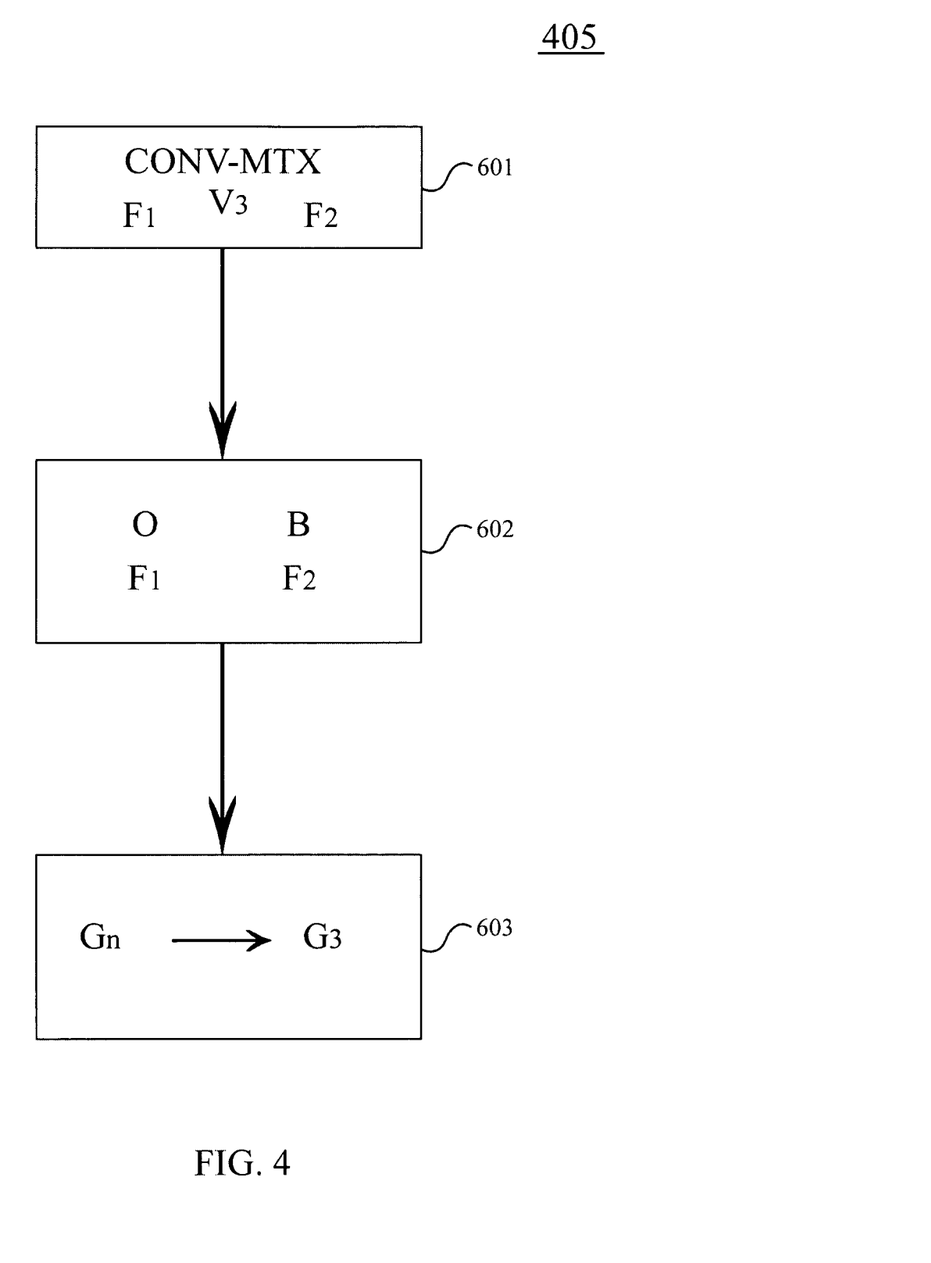
FIG. 4 depicts a flow chart of a first example of generation of the third document-word matrix from said first and second document-word matrices.

A first embodiment of the second processing step 405, wherein the third document-word matrix $G_3$ is obtained, is now described with reference to FIG. 4. The first embodiment of the processing step 405 includes a step of defining a first conversion matrix $F_1$ and a second conversion matrix $F_2$ 601 (CONV-MTX). The conversion matrices $F_1$ and $F_2$ can be obtained by means of the above defined conversion functions $f_1$ and $f_2$ used for the construction of the common vocabulary V3. The conversion matrices $F_1$ and $F_2$ include elements equal to 1 or to 0 and show dimensions $N_1 \times N_b$ and $N_2 \times N_b$, respectively.

$$F_1 \in \{0,1\}^{N_1 \times N_b}$$

$$F_2 \in \{0,1\}^{N_2 \times N_b}$$

If the word having index i is included in the common vocabulary V3, i.e. first conversion function $f_1(i)\neq 0$, then the first conversion matrix $F_1$ assumes the value 1:

$$F_1(i, f_1(i)) = 1$$

and the other elements of the row are null. If the word of index i is not present in the common vocabulary the row having index i of the first conversion matrix $F_1$ shows null elements. Moreover, if a word of index j is present in the common vocabulary V3 but is not present in the first vocabulary V1 the column having index j of the first conversion matrix $F_1$ shows null elements. Analogous definitions can be given for the second conversion matrix $F_2$ based on the second conversion function $f_2$.

In a first matrix generation step 602 a first non-weighted matrix O and a second non-weighted matrix B are defined. A non-weighted matrix is a matrix in which each row is associated to a document and each column is associated to a word. Each element (i,j) of a non-weighted matrix indicates the number of occurrences of the word j in the document i. The first non-weighted matrix O is based on the content text documents 200 and the second non-weighted matrix B is based on the text documents 300. A non-weighted common matrix $G_n$ is defined by using the first and second non-weighted matrices O and B and the first and second conversion functions $F_1$ and $F_2$:

$$G_n = \begin{bmatrix} OF_1 \\ BF_2 \end{bmatrix}$$

In a second matrix generation step 602 the non-weighted common matrix $G_n$ is transformed according to the tf-idf technique and the above defined third document-word matrix $G_3$ is obtained:

$$G_n \xrightarrow{tf\text{-}idf} G_3 \quad (6)$$

First Embodiment of the Recommendation Step 406

Figure 5:
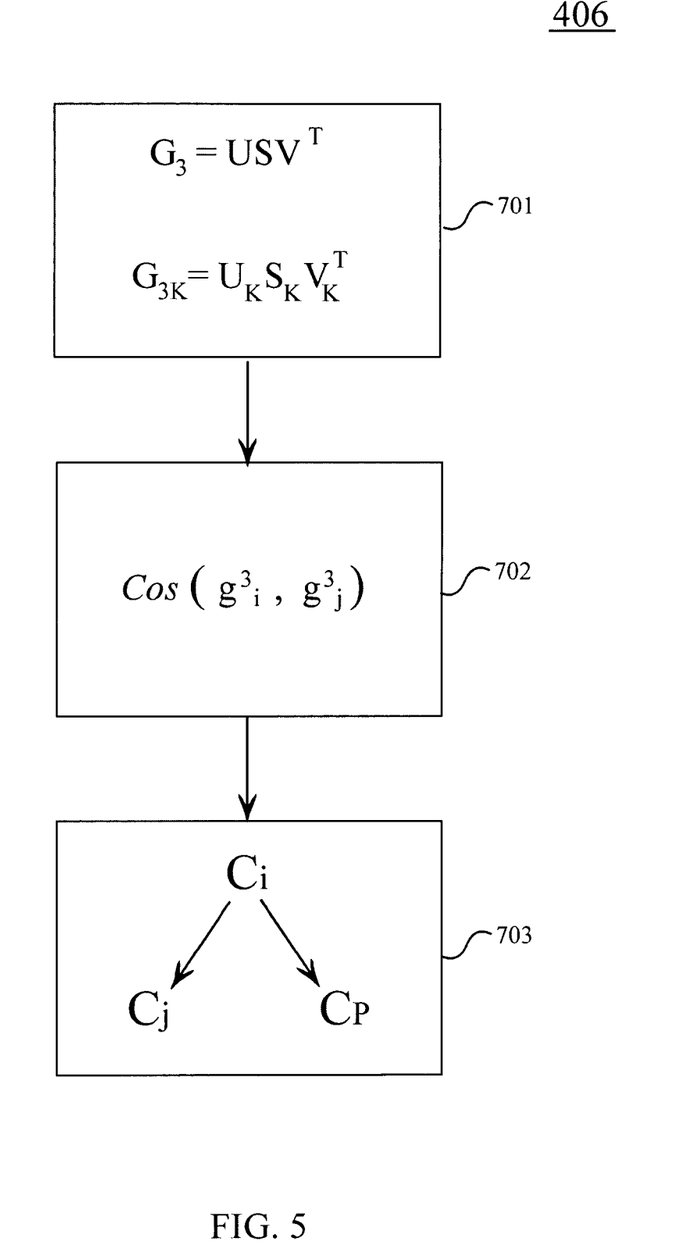
FIG. 5 shows a flow chart representing an embodiment of a recommendation step.

FIG. 5 shows a flow chart representing a first embodiment of the recommendation step 406 comprising a projecting step 701, a step of applying a similarity function 702 and a storing step 703. In the projecting step 701, the third document-word matrix $G_3$ is projected in lower dimensional space by applying a LSA technique. According to this technique, a lower rank approximation of the third document-word matrix $G_3$ is computed using a factorisation based on the Singular Value Decomposition method (SVD). It has to be noticed that the rank of the third document-word matrix $G_3$ can be as, an example, of the order of tens of thousands, while the LSA technique allows to reduce the rank down to 100-400. As an example, the LSA technique using the SVD method is described by M. W. Berry, S. T. Dumais, G. W. O'Brien in "Using Linear Algebra for Intelligent Information Retrieval," SIAM Review, Vol. 37, No. 4, pp. 573-595, 1995.

Therefore, in the projecting step 701 the third document-word matrix $G_3$ is expressed as the product of three matrices, i.e. the following factorisation:

$$G_3 = USV^T$$

wherein U is a matrix wherein each row corresponds to a document, S is a diagonal matrix containing singular values and V is word matrix ($V^T$ is the transpose of matrix V) wherein each row corresponds to a word. Matrices U and V are orthonormal.

The approximation of the third document-word matrix $G_3$ can be expressed by a truncation at a low rank $G_{3K}$ of the above factorisation and maintaining the first K components:

$$G_3 \approx G_{3K} = U_K S_K V_K^T \quad (7)$$

wherein the matrices $U_K$ and $V_K$ consist of the first K columns of matrices U e V, respectively, and $S_K$ consists of the first K rows and columns of matrix S.

The above truncation of the $G_3$ factorisation can be computed by processing algorithms known to the skilled in the art which can be memorised, as an example, under the form of a software in a LSA module to be stored in the memory 102 of the recommendation system 100 of FIG. 1.

It has to be noticed that the truncation expressed by the product $G_3 \approx G_{3K} = U_K S_K V_K^T$ allows establishing of relations between documents and words which were not present in the original third document-word matrix $G_3$ or they originally showed a low strength. Moreover, it is observed that the similarity computing performed on the third document-word matrix $G_3$ has a complexity that is of the order of $N_b \cdot M^2$ where $N_b$ is the number of words of the third vocabulary V3 and M is the number of documents in the set comprising the content text documents 200 and the documents 300. The number $N_b$ can be, as an example, of the order of many tens of thousands. Thanks to the above LSA technique the similarity computing has a complexity of the order of $K \cdot M^2$, where K is of the order of the hundreds ($K \ll N_b$).

With further reference to FIG. 5, the step of applying a similarity function 702 includes the definition of a function that allows obtaining relations between the content text documents 200. This function is based on the computing of the angle between the vectors corresponding to documents to be compared. In accordance with the described example, the similarity function can be applied to the above computed low rank factorisation $G_{3K}$ of the third document-word matrix $G_3$. In greater detail, with reference to expression (7) it has to be notice that the approximation $g3_i$ of document $d_i$ of the third document-word matrix $G_3$ is $$d_i^T \approx g3_i^T = u_i^T S_K V_K^T.$$

The row $u_i^T$ of the matrix $U_K$ corresponds to the i-th document $$U_K = \begin{bmatrix} u_1^T \\ M \\ u_M^T \end{bmatrix}$$

The similarity between i-th document and j-th document can be expressed by the following similarity function, i.e. the cosine of the angle between the corresponding vectors in the low rank factorisation $G_{3K}$:

$$\cos_L(g3_i, g3_j) = \frac{g3_i^T g3_j}{\|g3_i\|\|g3_j\|} \quad (8)$$

$$= \frac{u_i^T S_K V_K^T V_K S_K^T u_j}{\|V_K S_K^T u_i\|\|V_K S_K^T u_j\|}$$

$$= \frac{u_i^T S_K S_K^T u_j}{\|S_K^T u_i\|\|S_K^T u_j\|}$$

By using the expression (8) a similarity matrix can be defined wherein the i,j element represent the similarity between i-th document and j-th document. Expression (8) corresponds to a sum of products of if-idf weights associated to the documents to be compared.

By reference to the storing step 703, starting from the similarity matrix the couples of different content text documents having similarity greater than a threshold value are determined. Further contents Cj, . . . , Cp (FIG. 5) to be recommended are determined in connection with a reference content Ci. These results are stored in the database 103 (FIG. 1) by using, as an example, indexes that link reference content Ci to contents Cj and Cp. When the user of the recommendation system 100 retrieves data from database 103 concerning content Ci, the recommendation system 100 recommends also contents Cj and Cp. In an alternative and preferred embodiment, the contents are ordered in a list according to decreasing values of their similarities with content Ci and only a pre-established number of contents are selected and recommended (i.e. the first five contents of the list) to the user.

It has to be observed that in accordance with a further embodiment, the LSA technique can be avoided and the similarity function computing the cosine of an angle between documents can be applied directly to the third document-word matrix $G_3$.

Second Embodiment of the Recommendation Step 406

A second embodiment of the recommendation step 406 employs an LSA technique based on an incremental approach as depicted by H. Zha and H. Simon, in "On updating problems in latent semantic indexing", SIAM Journal of Scientific Computing, vol. 21, pp. 782-791, 1999" and by M. Brand in "Fast low-rank modifications of the thin singular value decomposition", Linear Algebra and its Applications, vol. 415, pp. 20-30, 2006".

In accordance with this approach, the third document-word matrix $G_3$ is not entirely processed by the LSA method as performed in the projecting step 701 of FIG. 5 but the decomposition technique is applied in an iterative manner by processing only L rows (i.e. L documents) at any step. According to this iterative method, at any step a i-th submatrix $G_{SMi}$ (having size L×$N_b$) of the third document-word matrix $G_3$ is processed by producing an updated factorisation the L×i first rows ($G_3$(L×i)) of the third document-word matrix $G_3$:

$$G_3(L \times i) \approx U_K^{(i)} S_K^{(i)} V_K^{(i)T}$$

At any step the submatrices $U_K^{(i)}$, $S_K^{(i)}$ and $V_K^{(i)}$ are used to update the matrices $U_K$, $S_K$ and, and $V_K$ which express the factorisation of the third document-word matrix $G_3$ in accordance with formula (7). When all the submatrices are processed the three matrices $U_K$, $S_K$ and $V_K$ have been obtained and the similarity function step 702 (FIG. 5) and the storing step 703 can be carried out as described above.

It has to be noticed that the matrix $S_K$ has size K×K (e.g. 400×400) and so it occupies a reduced memory portion. As an example, the matrix V has size $N_b$×K, $N_b=10^5$, K=400, where each scalar value is represented by 4 byte, then matrix V occupies 160 megabyte of memory. It has to be observed that matrix V occupies a constant memory portion during the iterative method. Matrix U has M×K, where M is the cumulative number of documents considered from the first step of the iterative processing to the one of index (M/L)-th. Since the total number of the content text documents and the context documents can be very great, the processing of matrix U can require a great memory portion and the processing unit resources could be insufficient. The incremental LSA method above described allows overcoming this situation; indeed it allows limiting the computing of the U matrix to a submatrix $U_0$ concerning the content documents about which a recommendation has to be provided and avoiding computing of a portion $U_B$ of matrix $U_K$ concerning the context documents. According to this method the memory assigned to matrix $U_K$ contains only rows corresponding to matrix $U_0$ (having size $N_0$×K) and the memory occupation can be reduced (e.g. $N_0=10^4$).

Second Embodiment of Second Processing Step 405: Alternative Generation of the Third Document-Word Matrix $G_3$.

It has to be noticed the decomposition using incremental factorisation as described in the above paragraph cold be computationally complex and needs a lot of processing time. There are situations in which an updating of the context documents by adding new newspaper articles or replacing them with other information sources is required and therefore the incremental factorisation should be repeated. In accordance with the embodiment hereinafter described, the LSA methods are applied separately to the first and second document-word matrices $G_1$ and $G_2$ and after that the corresponding resulting factorisations are merged.

Figure 6:
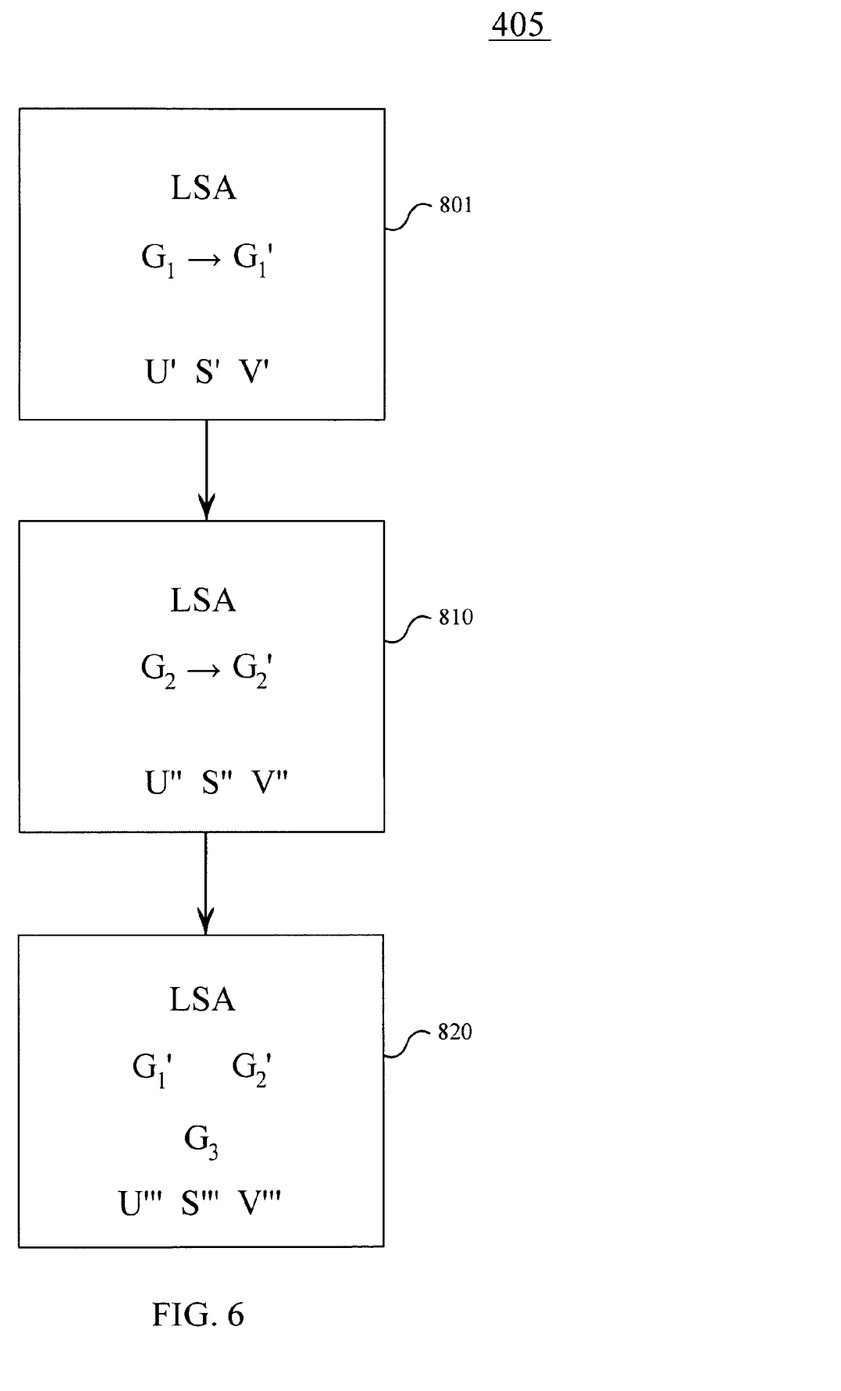
FIG. 6 depicts a flow chart of a generation step alternative to the one of FIG. 4.

In greater detail and with reference to FIG. 6 the second embodiment of the generation step 405 includes: a first LSA step 801 in which the first document-word matrix $G_1$ is processed, a second LSA step 810 in which the second document-word matrix $G_2$ is processed and a merging step 820 wherein the matrices resulting from the above defined modification steps 801 and 810 are merged.

Figure 7:
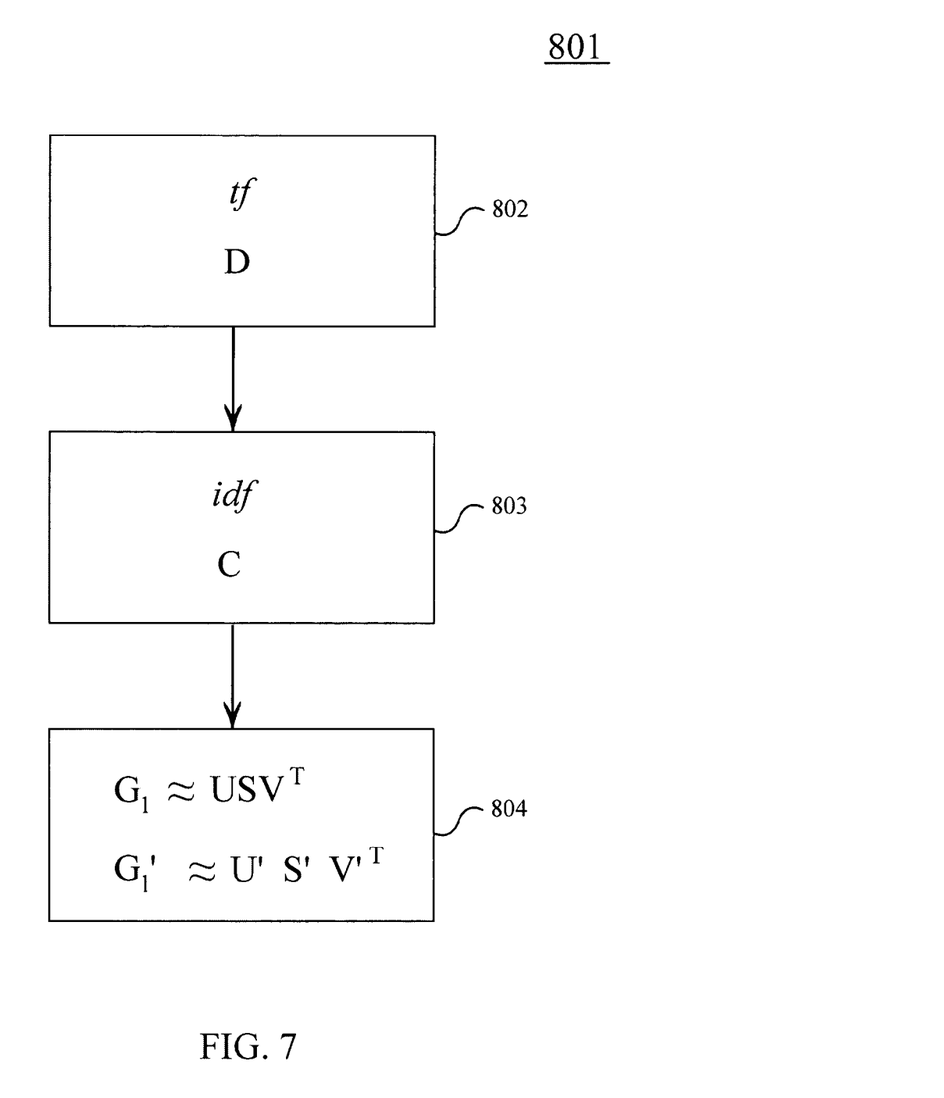
FIG. 7 illustrates a flow chart of a matrix decomposition process included in the generation step of FIG. 6.

FIG. 7 illustrates an example of the first LSA step 801 which includes a tf factor modification step 802, an idf factor modification step 803 an intermediate matrices computing step 804. In the tf factor modification step 802 a matrix D representing the modification of the first document-word matrix $G_1$ due to the modification of the first vocabulary V1 into the common vocabulary V3 is determined. When the vocabulary changes the total number of words could change and therefore tf factor has to be amended. Value $N_i$ represents the number of words of i-th document using the first vocabulary V1; value is the number of words included in the same document using the common vocabulary V3; the original tf factor is indicated as:

$$\lambda(i, j) = \frac{n_{ij}}{N_i}$$

where $n_{ij}$ is the number of time that the j-th word appears in the i-th document. The modified tf factor is:

$$\lambda'(i, j) = \frac{n_{ij}}{N_i'}$$
$$= \frac{n_{ij}}{N_i} \cdot \frac{N_i}{N_i'}$$
$$= \lambda(i, j) \cdot \frac{N_i}{N_i'}$$

It is observed that the above expression shows that the modified tf factor is expressed by the original tf factor multiplied for the ratio $N_i/N_i'$. Therefore, the first document-word matrix $G_1$ as modified by the change of the tf factor can be expressed by the following factorisation:

$$USV^T \alpha DUSV^T \quad (9)$$

where the elements of the diagonal matrix D are evaluated in accordance with the following formula:

$$D_{ii} = \frac{N_i}{N_i'}$$

The elements of matrix D are therefore computed by evaluating the ratio $N_i/N_i'$ for each row.

With reference to the idf factor modification step 803 it has to be observed that because of the union of the content text documents 200 together with the context documents 300 the total number of documents increases and the idf factor changes consequently. In the idf factor modification step 803 a matrix C representing the idf factor modification is computed. The number of documents included in the content text documents 200 is M while the total number of documents in the common set of documents (i.e. the union of content text documents 200 and text documents 300) to be used for the final factorisation is M'. The number of documents in which the j-th word appears is dj and the number of documents in which the same word appears in the common set of documents to be used in the final factorisation is dj'.

The new idf factor associated to the common set of documents is:

$$\gamma'(j) = \log\left(\frac{M'}{d'_j}\right) = \gamma(j) \cdot \frac{\gamma'(j)}{\gamma(j)}.$$

According to the above formula the new idf factor is proportional to the original idf factor $\gamma(j)$ by the ratio $$\frac{\gamma'(j)}{\gamma(j)}.$$

Therefore, the first document-word matrix $G_1$ as modified by the change of the idf factor can be expressed by the following factorisation:

$$USV^T \alpha USV^T C \quad (10)$$

where the elements of the diagonal matrix C are evaluated in accordance with the following formula:

$$C_{jj} = \frac{\gamma'(j)}{\gamma(j)}$$

The elements of matrix C are therefore computed by evaluating the ratio $$\frac{\gamma'(j)}{\gamma(j)}.$$

In the intermediate matrices computation step 804 the following factorisation $G_1$ of the first document-word matrix $G_1$ is evaluated to take into account of the modifications of both factors tf and idf:

$$G_1 \approx USV^T \alpha G_1'DUSV^T C \quad (11)$$

It is noticed that the product $DUSV^T C$ is not a valid SVD decomposition since matrices DU e $C^T V$ do not show orthonormal columns. The Applicant notices that it is possible to express the product including matrix D, DUS, by using the per se known factorisation "QR" A useful explanation of the factorisation QR can be found in the book L. N. Trefethen and D. Bau, Numerical Linear Algebra, The Society for Industrial and Applied Mathematics, 1997. Therefore, the following factorisation is computed:

$$DUS = Q_1 R_1 \quad (12)$$

Moreover, the product including matrix C, $C^T V$, can be expressed by another QR factorisation. Therefore, the following further factorisation is computed:

$$C^T V = Q_2 R_2 \quad (13)$$

Wherein matrices $Q_1$ and $Q_2$ show orthonormal columns, and matrices $R_1$ and $R_2$ are upper-triangular matrices. By expressions (12) and (13) it is obtained that:

$$DUSV^T C = Q_1 R_1 R_2^T Q_2^T$$

The central product $R_1 R_2^T$ is factorised by the following SVD decomposition:

$$R_1 R_2^T = \tilde{U}\tilde{S}\tilde{V}^T \quad (14)$$

It has to be observed that the factorisation expressed by formula (14) can be computed in a fast manner thanks to the fact that the product $R_1 R_2^T$ is a squared matrix having reduced size, equal to the size of the truncation of the first document-word matrix $G_1$.

From expressions (11), (12), (13) and (14) the factorisation of the first document-word matrix $G_i$ as modified by of the changes of factors tf and idf is:

$$DUSV^T C = Q_1 \tilde{U}\tilde{S}\tilde{V}^T Q_2^T$$

wherein products $Q_1\tilde{U}$ e $Q_2\tilde{V}$ are matrices having orthonormal columns, and matrix $\tilde{S}$ is a non-negative diagonal matrix having ordered values. Then, the factorisation of formula (11) can be expressed by:

$$G_1' \approx DUSV^T C = U'S'V'^T \quad (15)$$

where the matrix factors U', S' and V' are computed according to the following expressions:

$$U' = Q_1\tilde{U},$$

$$S' = \tilde{S},$$

$$V' = Q_2\tilde{V}. \quad (16)$$

The intermediate matrices computation step 804 allows expressing the first modified matrix $G_1'$, that is to say the first document-word matrix $G_1$ modified because of the union of the content text document 200 and the text document 300, by a factorisation employing the intermediate matrices U', S' and V'.

In the second LSA step 810 (FIG. 6) a second modified matrix $G_2'$ representing the second document-word matrix $G_2$ as modified because of the tf and idf factors changes can be expressed by the following factorisation:

$$U''S''V''^T \quad (17)$$

wherein further intermediate matrices U", S" and V" are computed in a way analogous to the one described with reference to FIG. 7.

An example of the merging step 820 is now described with reference to a flow chart shown in FIG. 8. The merging step 820 is based on the intermediate matrices of expressions (16) and (17) and includes a step of creating a union matrix 901 by lining up the two factorisations:

$$\begin{bmatrix} U'S'V'^T \\ U''S''V''^T \end{bmatrix} = \begin{bmatrix} U' & 0 \\ 0 & U'' \end{bmatrix}\begin{bmatrix} S'V'^T \\ S''V''^T \end{bmatrix} \quad (18)$$

Furthermore, the factor on the right side of expression (18) is factorised using the QR method (first factorisation step 902):

$$\begin{bmatrix} S'V'^T \\ S''V''^T \end{bmatrix} = R^T Q^T \quad (19)$$

The matrix $R^T$ (having, advantageously, a low size) is decomposed by using the SVD factorisation in a second factorisation step 903:

$$R^T = \hat{U}\hat{S}\hat{V}^T \quad (20)$$

and the following result is obtained:

$$\begin{bmatrix} U'S'V'^T \\ U''S''V''^T \end{bmatrix} = \begin{bmatrix} U' & 0 \\ 0 & U'' \end{bmatrix} \hat{U}\hat{S}\hat{V}^T Q^T \quad (21)$$

The following three factors U''', S''' and V'''$^T$ are then computed in computing step 904:

$$U''' = \begin{bmatrix} U' & 0 \\ 0 & U'' \end{bmatrix} \hat{U},$$

$$S''' = \hat{S}, \quad (22)$$

$$V''' = Q\hat{V},$$

As derivable by expressions (22), (21) and (18) the three factors U''', S''' and V''' allow to express in a truncated factorised manner the third document-word matrix $G_3$ in accordance with an innovative LSA technique. It has to be noticed that the computation of matrix V''' can be avoided considering that it is not employed in the similarity evaluation performed to recommend contents. Moreover, only rows of matrix U''' corresponding to the documents of the set of the content text documents 200 are computed considering that the recommendation concerns only such documents.

Figure 8:
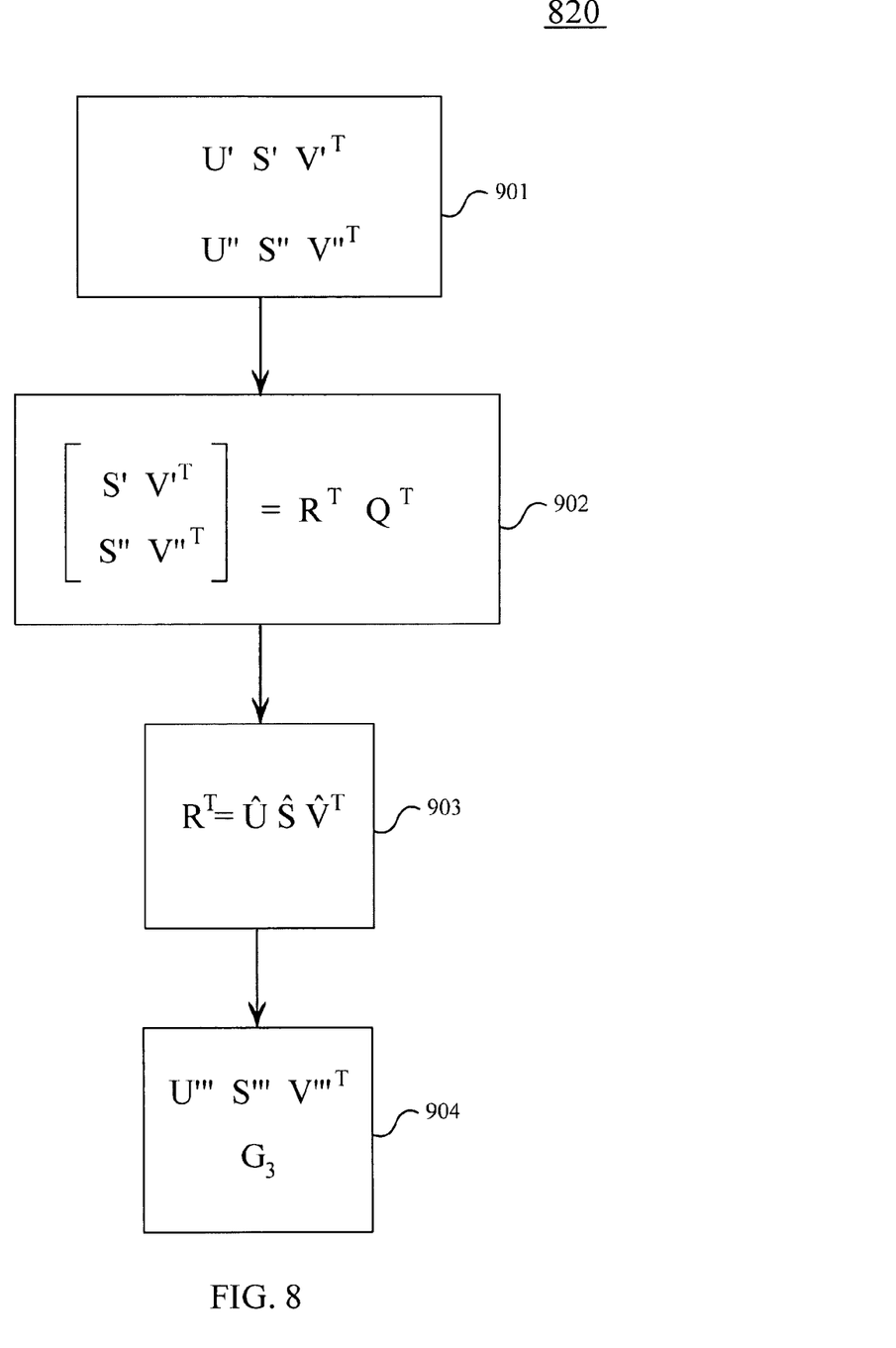
FIG. 8 depicts a flow chart representing a matrices merging step included in the generation step of FIG. 6.

Moreover, it has to be underlined that the second embodiment of second processing step 405 described with reference to FIGS. 6, 7 and 8 is particularly advantageous not only to merge factorisations of matrices concerning the contents and the context documents but also to merge matrices associated with different context documents or different contents. The procedure of FIGS. 6, 7 and 8 is computationally convenient in comparison to the LSA technique applied directly to the document-word matrix resulting from the union of two matrices when an updating of the set of document has to be performed. In fact, by applying the above described method a re-factorisation of the whole third document-word matrix $G_3$ is avoided and only the smaller matrix corresponding to the updated set of documents is re-factorised.

In accordance with the second embodiment of the second processing step 405 described with reference to FIGS. 6, 7 and 8, the recommendation step 406 (FIG. 2) does not include the projecting step 701 (FIG. 5) and so the similarity function step 702 (FIG. 5) is applied directly to the documents belonging to the U''' matrix expressed by formula (22) and subsequently the storing step 703 is performed.

Comparison Example

The Applicant has considered a set of 1432 content text documents consisting of films available on a video on demand system and a set of 20000 context documents consisting of newspaper articles. The reference content used for the recommendation is the film The Dead Pool, and the associated text is: "*Inspector Callaghan returns with a new mission: to stop a dangerous serial killer who eliminates his victims according to a list linked to a TV show. But this time he's among the targets*". In accordance with this example, only a pre-established number of contents (i.e. the first four contents) are selected and recommended to the user in a profile concerning the above indicated reference content.

Table 2, Table 3 and Table 4 refer to a standard LSA technique applied directly to the document-word matrix $G_1$ resulting from the first generation step 402 of FIG. 2. Table 2 shows the recommended films.

TABLE 2

(Standard LSA)

| Reference content | The Dead Pool |
|---|---|
| Recommended contents | Garfield 2 |
| | Teenage Mutant Ninja Turtles III |
| | Dressed to Kill |
| | Rocky Balboa |

It has to be observed that only the film Dressed to Kill shows an analogy with the reference content. The following Table 3 shows the words that are shared by the reference content and the recommended contents.

TABLE 3

(Standard LSA)

| Garfield 2 | Teenage Mutant Ninja Turtles III | Dressed to Kill | Rocky Balboa |
|---|---|---|---|
| new | this | killer | death |
| return | new | victim | return |
| time, as in "this time" | return | | |
| | time, as in "this time" | | |

Table 3 shows that: the shared words are not relevant to a thematic similarity for Garfield 2 and Teenage Mutant Ninja Turtles III; the common words selected for Rocky Balboa are more relevant than the previous case but however there are not sufficient for a thematic relation; only for case Dressed to Kill there is an actual thematic link.

Table 4 shows the most relevant words for the similarity computing. By analysing Table 4 is noticed that the words of the lists do not describe exactly the thematic of the corresponding films.

TABLE 4

(Standard LSA)

| Garfield 2 | Teenage Mutant Ninja Turtles III | Dressed to Kill | Rocky Balboa |
|---|---|---|---|
| new | new | new | death |
| time, as in "this time" | time, as in "this time" | do | new |
| life | time | time, as in "this time" | year |
| return | return | death | time, as in "this time" |
| death | decide | decide | decide |
| decide | death | woman | life |
| year | victim | victim | return |
| American | woman | life | leave |
| leave | police | come | police |
| find again | leave | part | time |

Table 5, Table 6, Table 7 refer to the recommendation method described with reference to FIG. 2 in accordance with the embodiments of FIGS. 6, 7 and 8.

TABLE 5

(Embodiment of the invention)

| Reference content | The Dead Pool |
|---|---|
| Recommended contents | The Spreading Ground |
| | Dressed to Kill |
| | In the Line of Fire |
| | Basic Instinct 2: Risk Addiction |

Table 5 allows appreciating that each of the recommended films shows a thematic similarity with the reference content. This similarity is also appreciable from Table 6 wherein the words that are shared by the reference content and the recommended contents are shown.

TABLE 6

(Embodiment of the invention)

| The Spreading Ground | Dressed to Kill | In the Line of Fire | Basic Instinct 2: Risk Addiction |
|---|---|---|---|
| eliminate | killer | stop | this |
| killer | victim | killer | time, as in "this time" |
| new | | | |
| serial | | | |

It is clear from the following Table 7 showing the most relevant words for the similarity computing that the listed words refer to the same thematic, that is to say crime and investigations.

TABLE 7

(Embodiment of the invention)

| The Spreading Ground | Dressed to Kill | In the Line of Fire | Basic Instinct 2: Risk Addiction |
|---|---|---|---|
| new | new | agent | agent |
| murderer | murderer | new | time, as in "this time" |
| come | death | secret | new |
| police | kill | police | police |
| kill | time, as in "this time" | murderer | murderer |
| agent | agent | time, as in "this time" | secret |
| death | decide | death | kill |
| decide | woman | kill | investigate |
| time, as in "this time" | police | assign | mysterious |

Even if the above description of the comparison example has been made in English language it has to be considered that the corresponding processing steps have been performed using texts and words in Italian language.

The Applicant has observed further situations in which the teaching of the invention gives better results than the ones obtainable with a standard LSA technique. The advantages of the teaching of the invention have been also noticed for a small number of contents and/or short content texts.

The invention claimed is:

1. A method of media content recommendation, comprising:
generating a first digital mathematical representation of media contents to associate the media contents with a first plurality of words describing the media contents, comprising defining content text documents describing the media contents by said first plurality of words and processing the first plurality of words to generate a first document-word matrix representing said media contents;
generating a second digital mathematical representation of context text documents, different from said content text documents, to associate said context text documents with a second plurality of words, comprising processing the second plurality of words to generate a second document-word matrix representing said context text documents, wherein the context text documents include subjects not connected to the media contents;
merging the first and second pluralities of words to create a common plurality of words;
processing the first and second digital mathematical representations to generate a common digital mathematical representation of the content and context text documents, based on the common plurality of words, comprising processing the first and second document-word matrices and the common plurality of words to generate a third document-word matrix representing the content and context text documents; and
providing media content recommendation by processing the common digital mathematical representation,
wherein processing the first and second document-word matrices and the common plurality of words to generate a third document-word matrix comprises:
decomposing the first document-word matrix into a product of three first matrices using QR factorisation technique while incorporating modifications of term frequency factors and inverse document frequency factors due to updating of said content and context text documents;
decomposing the second document-word matrix into a product of three second matrices using QR factorisation technique while incorporating modifications of term frequency factors and inverse document frequency factors due to updating of said content and context text documents;
merging the three first matrices and three second matrices to create a common matrix by concatenating the three first matrices as a first element of the common matrix and the three second matrices as a second element of the common matrix;
decomposing the common matrix into a product of three common matrices using QR factorisation technique; and
defining the third document-word matrix from said product of the three common matrices.

2. The method of claim 1, wherein providing media content recommendation comprises:
processing the common digital mathematical representation to apply a similarity function to associate a first media content with a second media content; and
storing in a database an index linking said first media content to said second media content.

3. The method of claim 1, wherein providing media content recommendation by processing the common digital mathematical representation comprises:
projecting the third document-word matrix onto a lower dimensional space using latent semantic analysis to determine a transformed document-word matrix; and
applying a similarity function to the transformed document-word matrix to determine significant semantic relations between media contents.

4. The method of claim 3, wherein projecting the third document-word matrix onto a lower dimensional space comprises:

decomposing the third document-word matrix into a product of at east three matrices; and applying dimensional reduction to the product of the at least three matrices and defining a transformed document-word matrix.

5. The method of claim 4, wherein decomposing and applying dimensional reduction comprises using a singular value decomposition technique.

6. The method of claim 4, wherein decomposing and applying dimensional reduction comprises:

using an incremental singular value decomposition technique by iteratively applying latent semantic analysis to submatrices of the third document-word matrix.

7. A media content recommendation system comprising at least one processor, memory, and database, the memory comprising:

a first generation module configured to generate a first digital mathematical representation of media contents associated with content text documents comprising a first plurality of words describing the media contents, the first digital mathematical representation comprising a first document-word matrix representing said media contents;

a second generation module configured to generate a second digital mathematical representation of context text documents different from said content text documents and associated with a second plurality of words, the second digital mathematical representation comprising a second document-word matrix representing said context text documents, wherein the context text documents include subjects not connected to the media contents;

a first processing module structured to merge the first and second pluralities of words to create a common plurality of words;

a second processing module structured to process the first and second digital mathematical representations to generate a common digital mathematical representation defining a common representation of the content and context text documents based on the common plurality of words, the common digital mathematical representation comprising a third document-word matrix representing a union of the content and context text documents; and a recommendation module configured to provide media content recommendation by processing the common digital mathematical representation, wherein the second processing module comprises:

a first factorization module configured to decompose the first document-word matrix into a product of three first matrices using QR factorisation technique while incorporating modifications of term frequency factors and inverse document frequency factors due to updating of said content and context text documents;

a second first factorization module configured to decompose the second document-word matrix into a product of three second matrices using QR factorisation technique while incorporating modifications of term frequency factors and inverse document frequency factors due to updating of said content and context text documents; and a third factorization module configured to merge the three first matrices and three second matrices to create a common matrix by concatenating the three first matrices as a first element of the common matrix and the three second matrices as a second element of the common matrix, decompose the common matrix into the product of three common matrices using QR factorisation technique, and determine the third document-word matrix from said product of the three common matrices.

8. The system of claim 7, wherein said recommendation module is configured to:

process the common digital mathematical representation by applying a similarity function and associating a first media content with a second media content; and storing in the database, an index linking said first media content to said second media content.

* * * * *